(12) United States Patent
Frick et al.

(10) Patent No.: US 12,185,879 B2
(45) Date of Patent: Jan. 7, 2025

(54) SMART CUTTING BOARD

(71) Applicant: BLOK Industries Inc., Malvern, PA (US)

(72) Inventors: Anthony J. Frick, Malvern, PA (US); Alissa L. Frick, Malvern, PA (US)

(73) Assignee: BLOK Industries Inc., Malvern, PA (US)

( * ) Notice: Subject to any disclaimer, the term of this patent is extended or adjusted under 35 U.S.C. 154(b) by 76 days.

(21) Appl. No.: 18/139,951

(22) Filed: Apr. 27, 2023

(65) Prior Publication Data

US 2024/0074620 A1 Mar. 7, 2024

Related U.S. Application Data

(63) Continuation-in-part of application No. 17/382,707, filed on Jul. 22, 2021, now Pat. No. 11,984,729.

(60) Provisional application No. 63/081,981, filed on Sep. 23, 2020.

(51) Int. Cl.
*A47J 47/00* (2006.01)
*G09B 5/02* (2006.01)

(52) U.S. Cl.
CPC ............ *A47J 47/005* (2013.01); *G09B 5/02* (2013.01)

(58) Field of Classification Search
CPC ..... H02J 50/005; A47J 47/005; G03B 17/561; H04R 1/028
See application file for complete search history.

(56) References Cited

FOREIGN PATENT DOCUMENTS

| CN | 20160028865 A | * | 3/2016 | ............ A47J 47/005 |
| KR | 101460857 B | * | 11/2014 | |

OTHER PUBLICATIONS

Machine Translation of KR20160028865A. "A Smart Water-Proof Chopping Board With The Touch Sensor Module" by Kim Hyeon et al. Mar. 14, 2016 (Year: 2016).*
Machine Translation of KR101460857B1. "Intellectual Chopping Board and Operating Method thereof" by Yang Sung Ho et al. Nov. 17, 2014 (Year: 2014).*

* cited by examiner

*Primary Examiner* — Nirvana Deonauth
(74) *Attorney, Agent, or Firm* — Gearhart Law, LLC

(57) ABSTRACT

A cutting board assembly is described. The cutting board assembly includes a cutting board, a docking station, and a computing device. The cutting board includes a cutting surface affixable to an electronics portion. The electronics portion includes a digital display. The docking station is configured to receive the cutting board. The docking station may include at least one speaker, at least one camera, at least one microphone, and a wireless charger. The computing device includes an application. The application is in wireless communication with the electronics portion and one or more of the at least one speaker, at least one camera, and at least one microphone.

18 Claims, 9 Drawing Sheets

SMART CUTTING BOARD

CROSS-REFERENCE TO RELATED APPLICATIONS SECTION

This application claims priority to U.S. application Ser. No. 17/382,707 filed on Jul. 22, 2021, which claims priority to U.S. Application Ser. No. 63/081,981 filed on Sep. 23, 2020, the entire contents of both of which are hereby fully incorporated by reference in their entirety.

FIELD OF THE EMBODIMENTS

The field of the invention and its embodiments relate to a cutting board. In particular, the field of the invention and its embodiments relate to a smart cutting board assembly comprising a cutting board, a docking station, and a computing device. The cutting board includes an electronics portion having a digital display and a cutting surface. The docking station has one or more devices and is configured to receive the cutting board. An application executable on the computing device is in wireless communication with the electronics portion and one or more devices of the docking station to allow a user to control the electronics portion, the digital display, and one or more devices.

BACKGROUND OF THE EMBODIMENTS

A cutting board is a household item that is a planar object placed on a horizontal surface. A food item is placed on the cutting board to prevent damage to the horizontal surface when cutting the food item. Cutting boards typically comprise a wood or a plastic material. Most cutting boards only have a single function, as they are used for preventing damage to the horizontal surface while cutting the food item. However, when a user is cooking and engaging with the cutting board, the user typically needs to follow a recipe or instructions to prepare the food item. To do so, the user must utilize a separate electronic device to read, watch, and/or listen to the recipe or instructions. Thus, what is needed is an enhanced smart cutting board incorporating an embedded digital display and one or more devices (such as a speaker, a microphone, and/or a camera, etc.) for ease of use while in the kitchen. Various cutting boards have been developed over time.

CN110338681 A describes an intelligent cutting board. The intelligent cutting board comprises a cutting board body, a weighing module, a voice module, a display module, and a control module. The weighing module, the voice module, the display module, and the control module are arranged on the cutting board body. The weighing module is used for measuring weight data of food materials placed on the weighing module. The voice module is used for retrieving a menu retrieval command and a menu operation command input by a user. The control module is used for controlling the display module to display the weight data, retrieving corresponding menu information according to the menu retrieval command, controlling the display module to display the menu information, and executing corresponding operation on the menu information displayed in the display module according to the menu operation command.

WO2019028645A1 describes a smart cutting board. The smart cutting board includes a top cover, a cutting tool placement slot, an electronic scale inner cavity, a cutting board, and an electronic scale. An upper position of the top cover is fixedly provided with a built-in groove and the top cover is movably connected to a cutting board inner cavity by means of hinges, fixing screws being fixedly connected to four corners of the hinges. A clip placement slot is symmetrically disposed below the cutting tool placement slot and an upper portion of the electronic scale inner cavity is fitted with an inner portion of a waterproof layer. A water guiding device is symmetrically arranged at an upper left corner of the cutting board, a water drain and air vent hole being fixedly installed at a bottom portion thereof. A fixed locking buckle is arranged at a center of a right end of the cutting board and the electronic scale is connected to an inner portion of a display screen. A music player is also arranged within the cutting board. The smart cutting board is provided with the electronic scale and when the ingredients are placed on the electronic scale, the weights thereof may be automatically displayed by means of the high-definition liquid crystal display screen.

WO2018202375A1 describes a smart cutting board having a body. The body has at least one surface suitable for cutting foodstuff such as vegetables, fruits, etc. A plurality of light sources are arranged on at least one edge of the body for sending light parallel to the surface of the body. A plurality of photodiodes are arranged in the body. The photodiodes detect light beams hitting the surface. A control unit is utilized for enabling the foodstuff type to be determined based on the data related to the light beams that are emitted by the light sources and reflect from the foodstuffs placed on the surface of the body so as to be detected by the photodiodes.

CN105595877A describes an intelligent cutting board. The intelligent cutting board comprises an electronic scale, a cutting board, and a knife rest. The electronic scale comprises a scale pan, a sensor, and a display. The intelligent cutting board is characterized in that the scale pan of the electronic scale is arranged on the cutting board, the display of the electronic scale is arranged on the knife rest, the knife rest is integrally connected with the cutting board by a spiral shape, and the weights of foods can be transmitted to the display by the sensor of the electronic scale via the hollow spiral shape.

KR101460857B1 describes a smart chopping board. The smart chopping board includes a tablet computer including a display on one side, a chopping board plate having an area larger than the display, a supporting plate closely attached to the bottom surface, and a step unit formed in between the chopping board plate and the supporting plate. The tablet computer is located on the bottom surface for the display to face upward.

U.S. Pat. No. 6,359,239B1 describes a cutting board suitable for commercial or non-commercial purposes in which food can be cut on a cutting surface of the cutting board surface and slid quickly and simply to a separate scale weighing surface of the cutting board surface to be weighed. The weighing surface on which the food is weighed is separately supported by a scale and move upwardly and downwardly independent of the cutting area. The cutting board also includes a visual display that displays information representative of the food, such as, for example, the weight of the food resting on the scale surface. A control panel includes one or more selector switches that allow the user to customize information displayed on the visual display and input information representative of the food. The cutting surface, weighing surface, visual display, and control panel are sealed as to prevent food, liquid, washing solution, or the like, from entering the cutting board. The cutting board preferably includes an internally disposed battery for providing power to the scale, display and associated electrical circuitry. The orientation of the read-out may be inverted by a selector switch so that the board may be turned around to accommodate either a left-handed or a right-handed user.

Some cutting boards and smart cutting boards exist in the art. However, their means of operation are substantially different from the present disclosure, as the other inventions fail to solve all the problems taught by the present disclosure.

SUMMARY OF THE EMBODIMENTS

The present invention and its embodiments relate to a cutting board. In particular, the field of the invention and its embodiments relate to a smart cutting board assembly comprising a cutting board, a docking station, and a computing device. The cutting board includes an electronics portion having a digital display and a cutting surface. The docking station has one or more devices and is configured to receive the cutting board. An application executable on the computing device is in wireless communication with the electronics portion and the one or more devices of the docking station to allow a user to control the electronics portion, the digital display, and the one or more devices.

A first embodiment of the present invention describes a cutting board assembly. The cutting board assembly includes a cutting board, a docking station, and a computing device. The cutting board includes a cutting surface affixable to an electronics portion. The cutting surface is a non-porous cutting surface. The electronics portion includes a digital display.

The docking station is configured to receive the cutting board. The docking station includes one or more devices, such as a speaker, a camera, and/or a microphone, among others. The docking station also includes a wireless charger that charges the one or more devices of the cutting board assembly. The computing device includes an application and the application is in wireless communication with the electronics portion and the one or more devices of the docking station.

In one embodiment, the electronics portion comprises a protrusion and the cutting surface comprises a recession such that the recession is configured to receive the protrusion to affix the electronics portion to the cutting surface to form the cutting board. In some implementations, the protrusion is a magnetic protrusion and the recession is a magnetic recession.

The docking station of this first embodiment includes a planar base and a vertical component affixed perpendicular to the planar base. The vertical component is a u-shaped component comprising an opening disposed therein. The planar base includes a first side disposed opposite a second side, a first end disposed opposite a second end, and a third end disposed opposite a fourth end. The second side is configured to contact a horizontal surface, such as a countertop. The planar base further comprises a lip component affixed perpendicular to the first end. In some examples, the vertical component comprises a first magnetic portion and the electronics portion of the cutting board comprises a second magnetic portion. When the first magnetic portion is in a magnetic attraction with the second magnetic portion, the cutting board is receivable and secured in a vertical position in a portion between the vertical component and the lip component.

A second embodiment of the present invention describes a cutting board assembly. The cutting board assembly includes a cutting board, a docking station, and a computing device. The cutting board includes a cutting surface affixable to an electronics portion. The electronics portion includes a digital display. The docking station is configured to receive the cutting board. The docking station includes a planar base having a first side disposed opposite a second side, a first end disposed opposite a second end, and a third end disposed opposite a fourth end. The docking station also includes a vertical component affixed perpendicular to the planar base. The vertical component is a u-shaped component comprising an opening disposed therein. The planar base further comprises a lip component affixed perpendicular to the first end. The lip component comprises at least one camera and at least one microphone. The vertical component comprises at least one speaker.

The computing device includes an application that is in wireless communication with the electronics portion and one or more of the at least one speaker, at least one camera, and at least one microphone. The at least one speaker is configured to stream audio. The at least one camera and the at least one microphone are configured to allow a user share and engage with visual media. In at least one embodiment, the audio and the visual media are associated with a class. In some non-exhaustive examples, this class is a cooking class.

In general, the present invention succeeds in conferring the following benefits and objectives.

It is an object of the present invention to provide a multi-functional cutting board assembly.

It is an object of the present invention to provide a smart cutting board assembly.

It is an object of the present invention to provide a smart cutting board assembly that includes one or more speakers, microphones, and cameras that are controllable by an application executable on a computing device.

It is an object of the present invention to provide a multi-functional cutting board assembly, allowing a user to share and engage with a class, such as a cooking class, through one or more speakers, cameras, and/or microphones while using the cutting board assembly.

DESCRIPTION OF THE PREFERRED EMBODIMENTS

Figure 1:
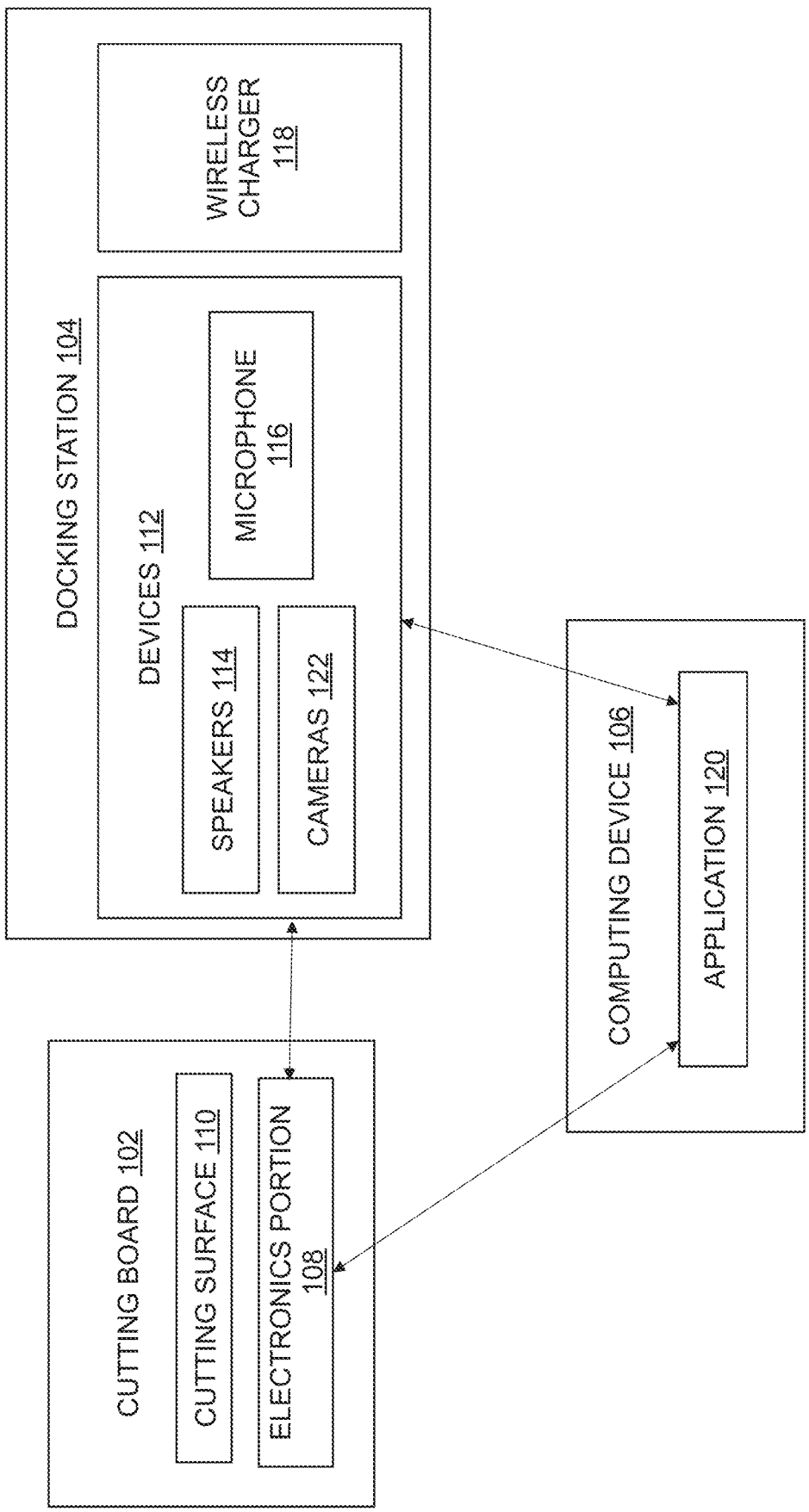
FIG. 1 depicts a block diagram of a system, according to at least some embodiments disclosed herein.
Figure 2:
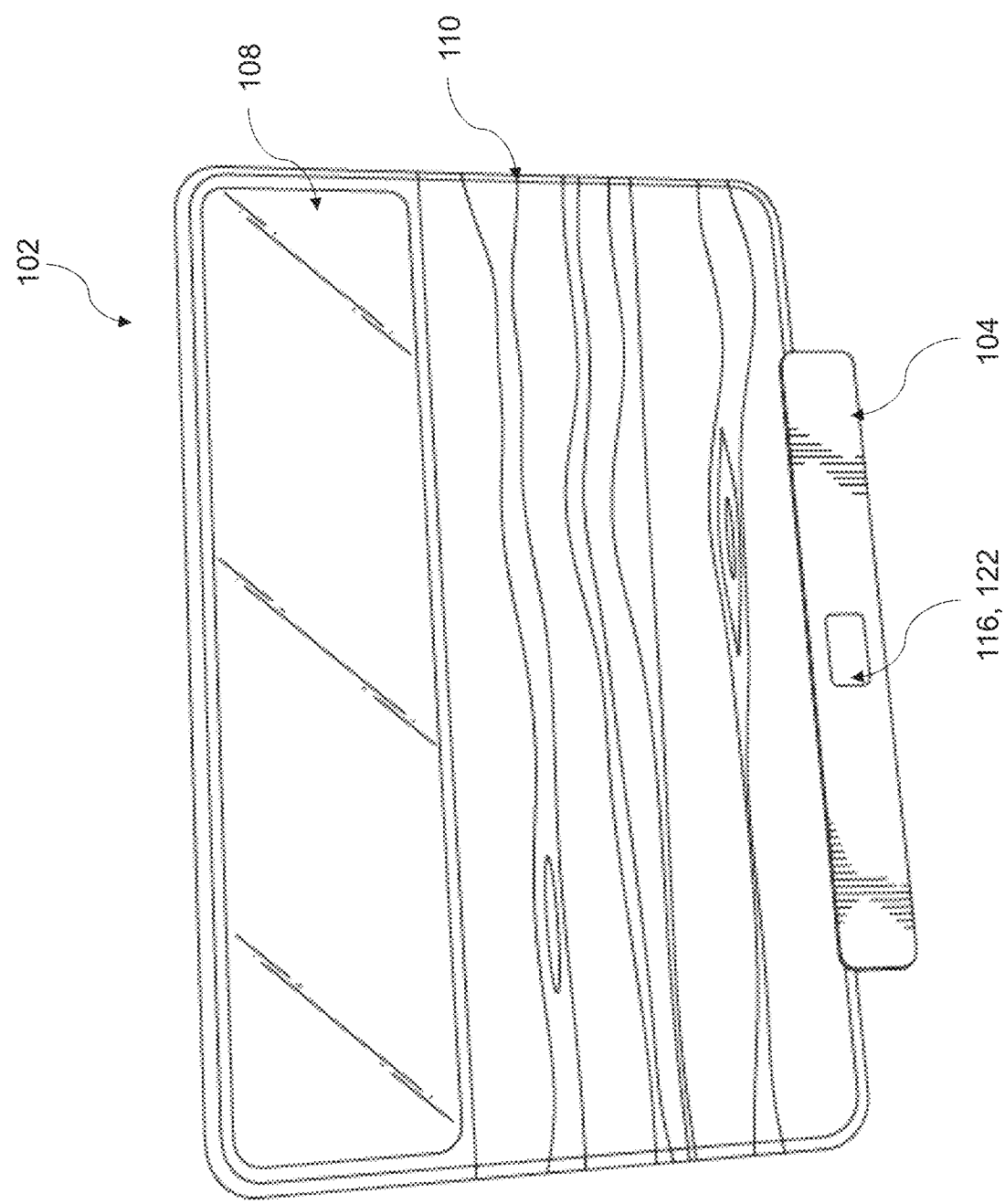
FIG. 2 depicts a perspective view of a schematic diagram of a cutting board assembly housed in a docking station, according to at least some embodiments disclosed herein.
Figure 3:
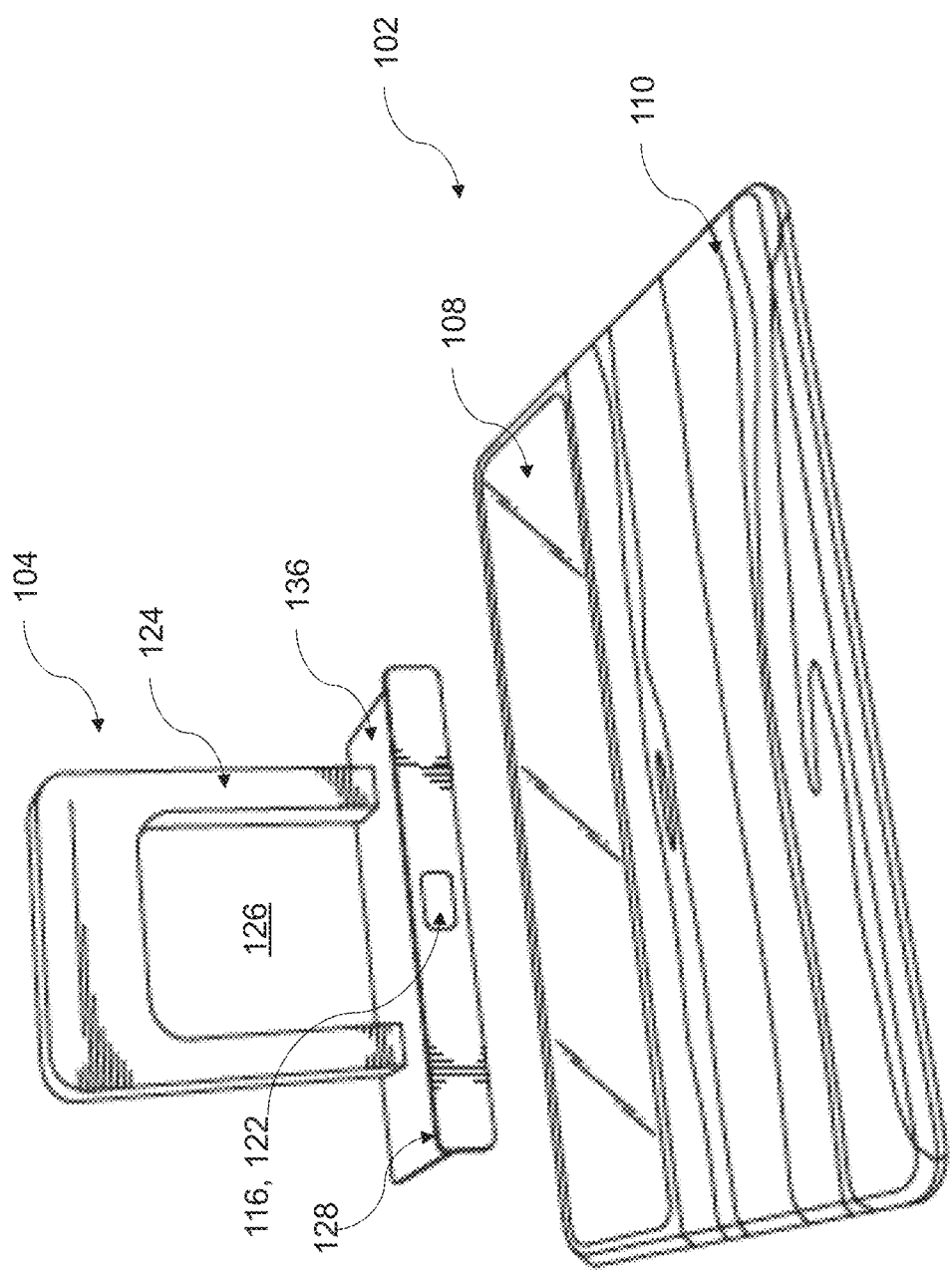
FIG. 3 depicts a perspective view of a schematic diagram of a cutting board assembly and a docking station, according to at least some embodiments disclosed herein.
Figure 4:
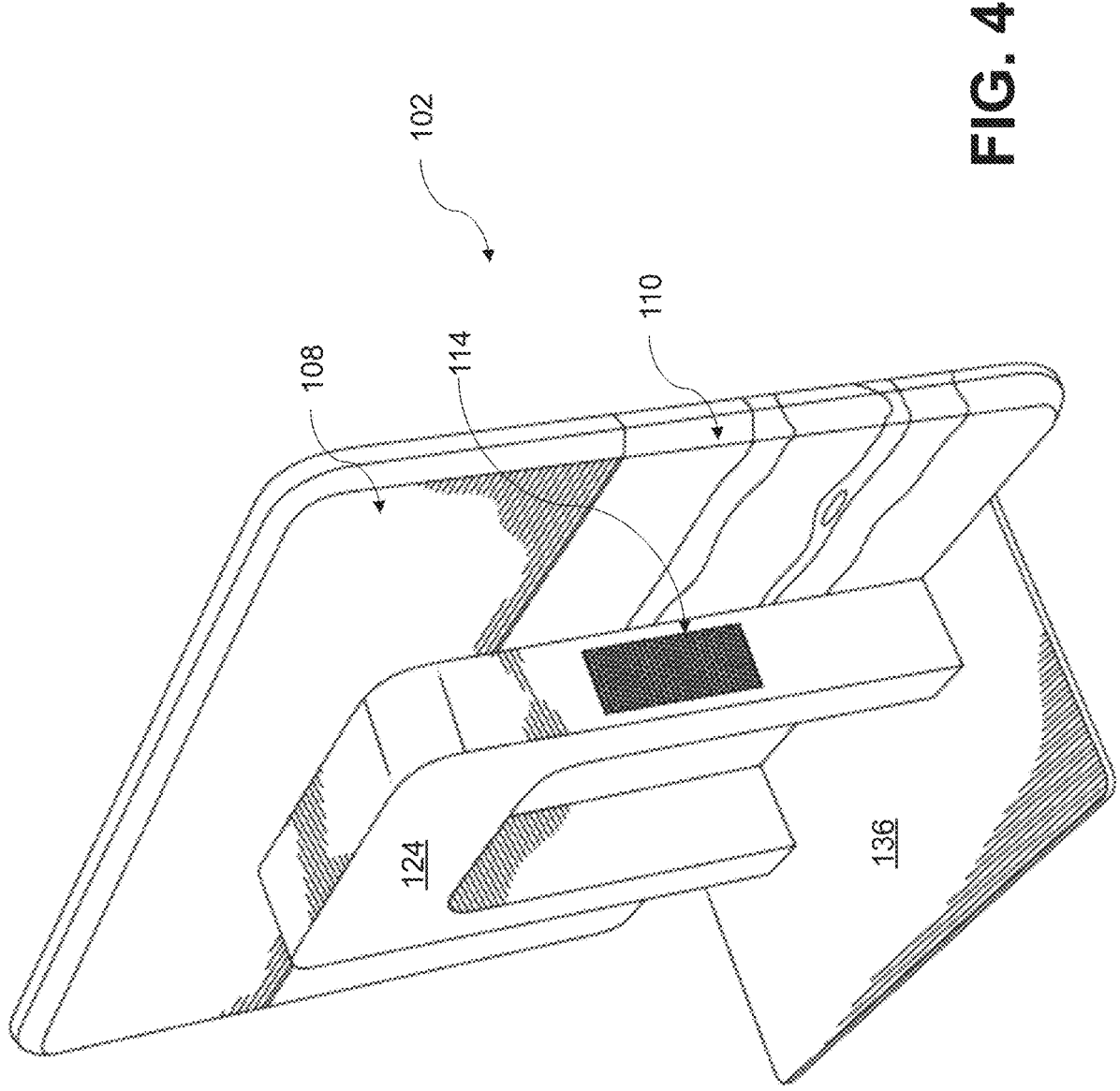
FIG. 4 depicts a rear view of a schematic diagram of a cutting board assembly housed in a docking station, according to at least some embodiments disclosed herein.
Figure 5:
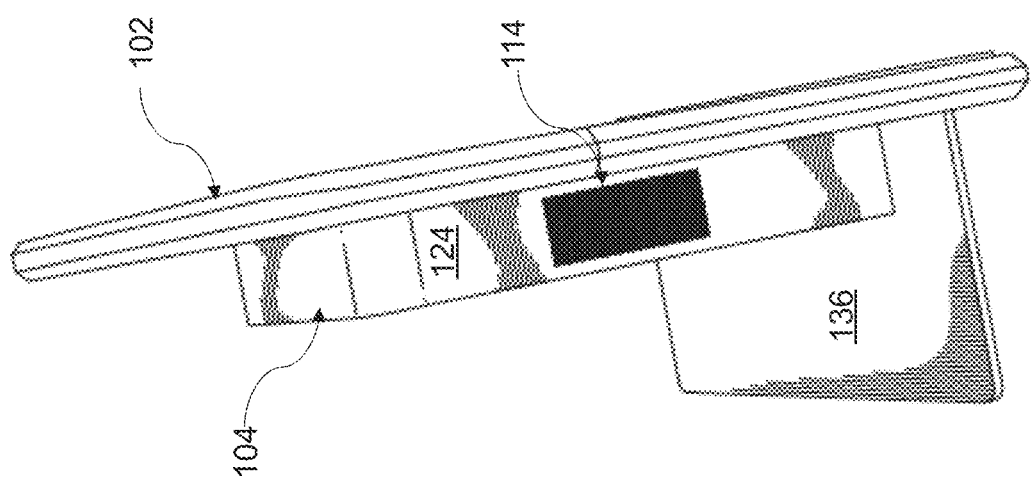
FIG. 5 depicts a side view of a schematic diagram of a cutting board assembly housed in a docking station, according to at least some embodiments disclosed herein.
Figure 6:
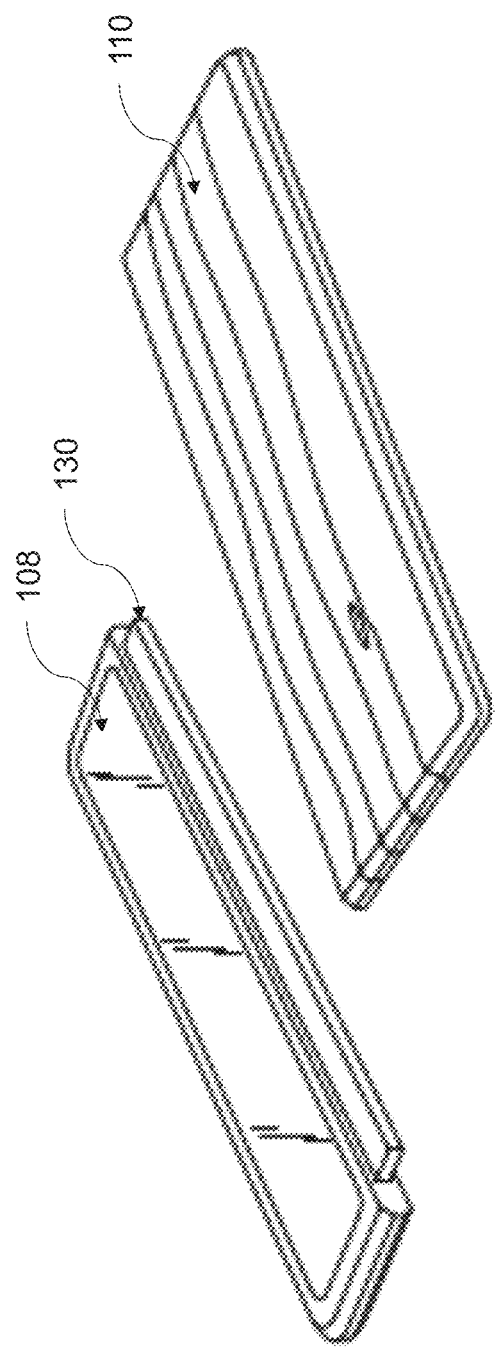
FIG. 6 depicts a perspective view of a cutting surface and a digital display that together form a cutting board, according to at least some embodiments disclosed herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 7:
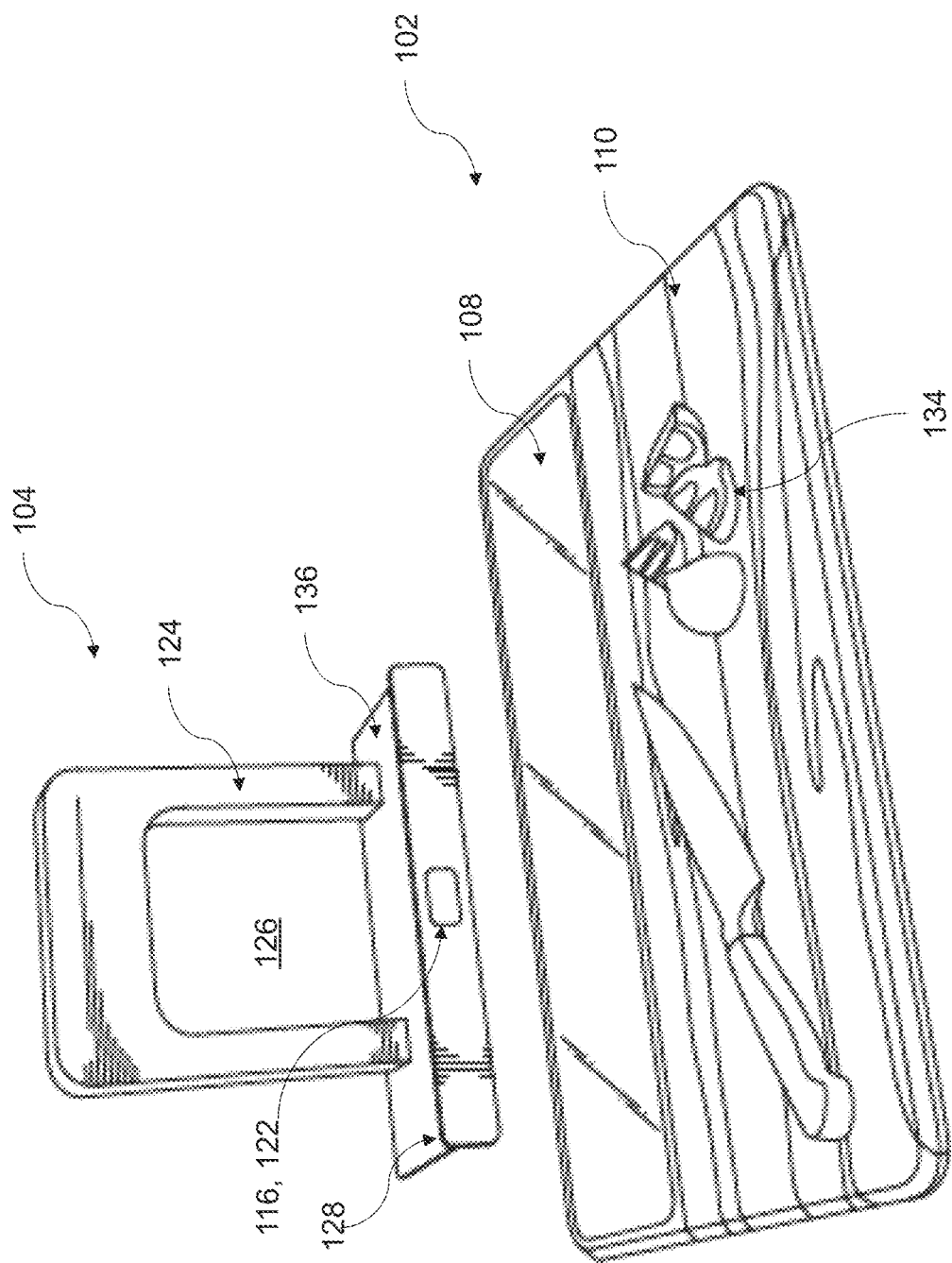
FIG. 7 depicts a perspective view of a schematic diagram of a cutting board assembly and a docking station, according to at least some embodiments disclosed herein.

A cutting board assembly is described and depicted herein. The cutting board assembly includes a cutting board 102 (of FIG. 1, FIG. 2, FIG. 3, FIG. 4, FIG. 5, and FIG. 7), a docking station 104 (of FIG. 1, FIG. 2, FIG. 3, FIG. 5, and FIG. 7), and a computing device 106 (of FIG. 1) or a computing device 222 (of FIG. 8). In general, the cutting board 102 includes a cutting surface 110 (of FIG. 1, FIG. 2, FIG. 3, FIG. 4, FIG. 6, and FIG. 7) affixable to an electronics portion 108 (of FIG. 1, FIG. 2, FIG. 3, FIG. 4, FIG. 6, and FIG. 7). The cutting surface 110 is a non-porous cutting surface 110 such that a food item 134 (of FIG. 7) (such as a vegetable, a fruit, a meat, a bread, etc.) may be cut thereon. In some examples, the cutting board 102 is rectangular in shape. However, it should be appreciated that the cutting board 102 may be any other shape. The electronics portion 108 includes a digital display. In at least one embodiment, the digital display is an embedded digital display.

The docking station 104 is configured to receive the cutting board 102. The docking station 104 includes one or more devices 112 (of FIG. 1), such as at least one speaker 114 (of FIG. 1, FIG. 4, and FIG. 5), at least one camera 122 (of FIG. 1, FIG. 2, FIG. 3, and FIG. 7), and/or at least one microphone 116 (of FIG. 1, FIG. 2, FIG. 3, and FIG. 7), among others. The docking station 104 also includes a wireless charger 118 (of FIG. 1) that charges the one or more devices 112 of the cutting board assembly. The computing device 106 may be a computer, a smartphone, a laptop computer, a tablet, or another suitable computing device. The computing device 106 includes an application 120 (of FIG. 1 and FIG. 8). The application 120 is in wireless communication with the electronics portion 108 and the one or more devices 112 of the docking station 104.

In one embodiment, the electronics portion 108 comprises a protrusion 130 (of FIG. 6) and the cutting surface 110 comprises a recession (see FIG. 9) such that the recession is configured to receive the protrusion 130 to affix the electronics portion 108 to the cutting surface 110 to form the cutting board 102. In some implementations, the protrusion 130 is a magnetic protrusion and the recession is a magnetic recession. It should be appreciated that the magnetic protrusion and the magnetic recession may comprise a magnetic component or a plurality of magnets. The magnets are not limited to any particular type or size. The magnetic attraction described herein allows the cutting surface 110 to be removed from the electronics portion 108 for cleaning purposes.

The digital display of the electronics portion 108 has a mirrored surface that a user can see the digital display through. The digital display is scratch resistant and can take a knife cutting on top of it. However, in some implementations, the electronics portion 108 comprises a removable surface that may be removed for replacement and/or cleaning purposes. Moreover, the removable surface is interchangeable with other similar removable surfaces. The removable surface comprises a plastic material, a non-scratch plastic material, a transparent wood material, and/or a glass material, among other materials not explicitly listed herein. It should be appreciated that the removable surface is transparent such that the digital display of the cutting board 102 is viewable to a user through the removable surface.

More specifically, the docking station 104 includes a planar base 136 (of FIG. 3, FIG. 4, FIG. 5, and FIG. 7) and a vertical component 124 (of FIG. 3, FIG. 4, FIG. 5, and FIG. 7), affixed perpendicular to the planar base 136. The vertical component 124 is a u-shaped component comprising an opening 126 (of FIG. 3 and FIG. 7) disposed therein. The planar base 136 includes a first side disposed opposite a second side, a first end disposed opposite a second end, and a third end disposed opposite a fourth end. The second side of the planar base 136 is configured to contact a horizontal surface, such as a countertop or table.

In one embodiment, the second side of the planar base 136 comprises one or more non-slippage components. In further examples, a bottom side of the cutting surface 110 and/or the electronics portion 108 comprises the one or more non-slippage components. A quantity of the one or more non-slippage components are not limited to any particular quantity. In one embodiment, the one or more non-slippage components may comprise a rubber material. However, a material of the one or more non-slippage components is not limited to such material. The planar base 136 further comprises a lip component 128 (of FIG. 3 and FIG. 7) affixed perpendicular to the first end of the planar base 136.

In one embodiment, the vertical component 124 of the docking station 104 comprises a first magnetic portion and the electronics portion 108 of the cutting board 102 comprises a second magnetic portion. When the first magnetic portion is in a magnetic attraction with the second magnetic portion, the cutting board 102 is receivable and secured in a vertical position in a portion between the vertical component 124 and the lip component 128. It should be appreciated that the first magnetic portion and the second magnetic portion may comprise a magnetic component or a plurality of magnets. The magnets are not limited to any particular type or size. Moreover, in examples, the cutting board 102 may be disconnected from the docking station 104 and may be laid flat on the horizontal surface, such as the tabletop during use.

In some examples, the lip component comprises the at least one camera 122 and/or the at least one microphone 116, among other devices not explicitly listed herein. In one embodiment, the vertical component 124 comprises the at least one speaker 114.

The computing device 106 includes the application 120 that is in wireless communication with the electronics portion 108 of the cutting board 102 and the at least one speaker 114, the at least one camera 122, and/or the at least one microphone 116, among other devices 112 not explicitly listed herein. It should be appreciated that the at least one speaker 114 is configured to stream audio. The at least one camera 122 and the at least one microphone 116 are configured to allow the user share and engage with visual media.

The user may engage with the application 120 of the computing device 106 or the computing device 222 to stream audio and/or visual media to the digital display of the electronics portion 108 and/or the one or more devices 112 of the docking station 104. Moreover, the user may engage with the application 120 of the computing device 106 or the computing device 222 to modify one or more parameters (such as a volume) of the audio and/or visual media.

In one embodiment, the audio and/or visual media are associated with a class, such as a cooking class. In some examples, the cooking class may be a live or a real-time cooking class. In further examples, previously live-streamed cooking classes may be available in a digital library associated with the application 120, such that the user may engage with one of the previously live-streamed cooking classes at his/her convenience. In some examples, the cooking classes may be organized in the digital library via a food journey, such as a decadent and rich food journey, a healthy food journey, a regional cuisine food journey, and a cheap and tasty food journey, among others. Each of the food journeys may be associated with two or more recipes or cooking lessons. For example, the decadent and rich food journey may include four recipes or cooking lessons, associated with teaching the user a fish, a meat, a poultry, and a vegetarian recipe, respectively.

In further embodiments, the cooking class may be selected by the user from the digital library based on food preferences and/or the individual's specific dietary preferences. In additional examples, ingredients for a particular cooking class may be purchased via the application 120 through one or more application programming interfaces (API's) with a variety of grocery delivery services to deliver the ingredients directly to the user. Moreover, in further examples, the application 120 may provide a social media feature such that the user may invite other users and/or engage with other users during the cooking class.

As explained previously, the docking station 104 may also include the wireless charger 118. In one embodiment, the docking station 104 may include an electrical plug that may be affixed to a cord or a wire. The cord or the wire may be affixed to the planar base 136 of the docking station 104. The electrical plug is configured to engage a power source, such as an electrical outlet, to charge one or more components of the cutting board assembly.

Figure 9:
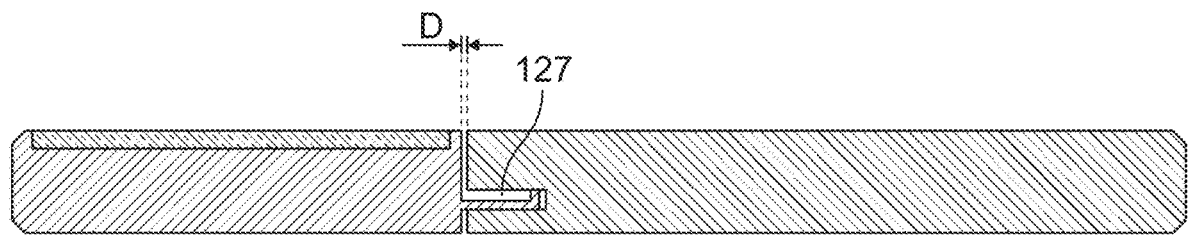
FIG. 9 depicts a sectional side view of an embodiment of the cutting board assembly of the present invention.
Figure 10:
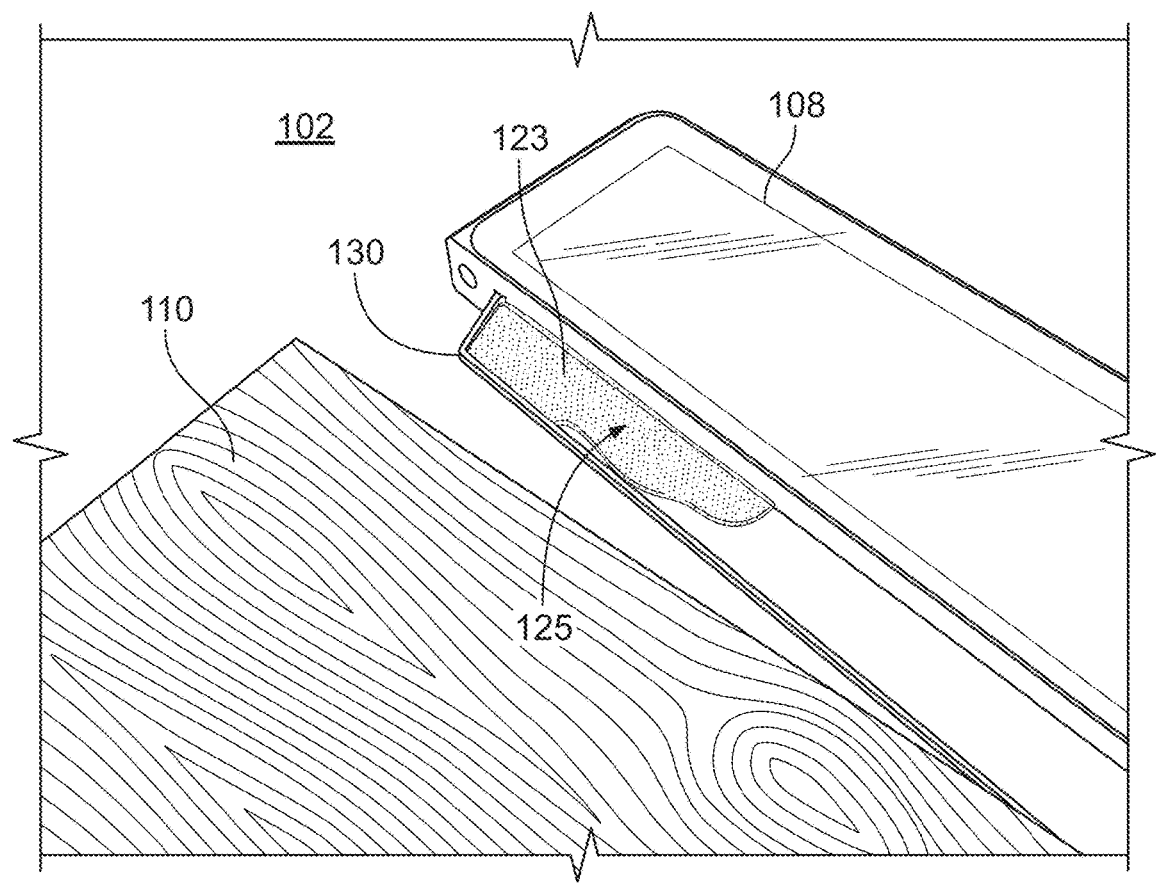
FIG. 10 depicts the electronics portion of the cutting board assembly slightly separated from the cutting board showing a liquid receiving tray.

Referring now to FIGS. 9 and 10, there is a sectional side view and a second view with the electronics portion 108 separated from the cutting surface 110 of the cutting board 102, respectively. In this embodiment, there is an additional structural feature of a liquid receiving structure or juice tray 123. The liquid receiving structure 123 is formed from the protrusion 130 of the electronic portion 108 and allows for waste liquids (from preparing food, etc.) to be collected and removed from the cutting surface 110 and later disposed of in a sink, waste can, etc.

As shown in FIG. 9, the protrusion 130 of the electronics portion 108 is configured to reside mostly (or completely) within the recession 127 formed in the cutting surface 110 of the cutting board 102. There may be a distance D between an edge of the cutting surface 110 and an edge of the electronics portion 108 as shown. This distance D allows for liquids 125 from an upper surface of the cutting surface 110 to permeate downwards and into the liquid receiving structure 123. Accordingly, the protrusion 130 may be sized to accommodate this distance D. The cutting surface 110 and/or electronics portion 108 may also be sized and/or shaped in such a way to create a distance D. This distance D may be virtually any distance between the surfaces of the cutting surface 110 and the electronics portion 108. In at least one embodiment, the distance D may be about 0.1 mm to about 15 mm. The distance D generally needs to be sized to readily allow liquid to pass downwards between the cutting surface 110 and the electronics portion 108 to the liquid receiving structure 123.

FIG. 10 shows the cutting surface 110 and the electronics portion 108 slightly separated thereby showing the structure of the liquid receiving structure 123 and protrusion 130. As shown, the protrusion 130 may not span the entire width of the electronics portion 108. However, in other embodiments the protrusion 130 may have a width equal to that of the electronics portion 108. In other embodiments, the protrusion 130 has a width that is narrower than shown. The protrusion 130 has two primary functions: 1) to help secure the electronics portion 108 to the cutting surface 110; and 2) to retain liquid food waste. Regarding the first primary function, the protrusion 130 may function as previously described herein. Regarding the second primary function, the protrusion 130 may be shaped to retain liquid food waste.

In order to retain liquid food waste, a portion of the protrusion 130 is shaped and sized to have a recess in an upper surface of the protrusion 130. This recess may span substantially the entire upper surface of the protrusion (save for liquid retaining sidewalls as shown) or may be further strategically sized and shaped based on intended usage and shape of the cutting surface 110. The depth of the recess may vary as long as a bottom and sides of the recess are sized and shaped to ensure the recess is impermeable to liquid and does not fully penetrate a length of width of the protrusion 130 in any direction. The recess may have a shape (slants, angles, grooves, etc.) to help direct the flow of liquid food waste therein and prevent waste from spilling from the recess. In some embodiments, the cutting surface 110 also has structures (grooves, openings, grades, etc.) configured to direct liquid food waste into the liquid receiving structure 123.

In use, a user, upon desiring to empty the liquid receiving structure 123 from liquids 125 would detach the electronics portion 108 from the cutting surface 110 and then take the electronics portion 108 to a sink or garbage or the like and simply tip the electronics portion 108 in a direction sufficient to cause the liquid 125 to spill over an edge of the recess and into the sink or garbage or the like. In some embodiments, the protrusion 130 has a lip that aids in pouring of the liquid 125 from the recess. In other embodiments, the protrusion 130 has a drain in a lower surface that may be selectively uncovered to allow for the liquid 125 to pass therethrough to be disposed.

In at least one embodiment the liquid receiving structure 123 is capable of holding at least 0.1 oz of liquid. However, the liquid receiving structure 123 may hold anywhere from 0.1 oz up to 10 oz depending on the shape and size of the protrusion 130 and appropriate recess.

Figure 8:
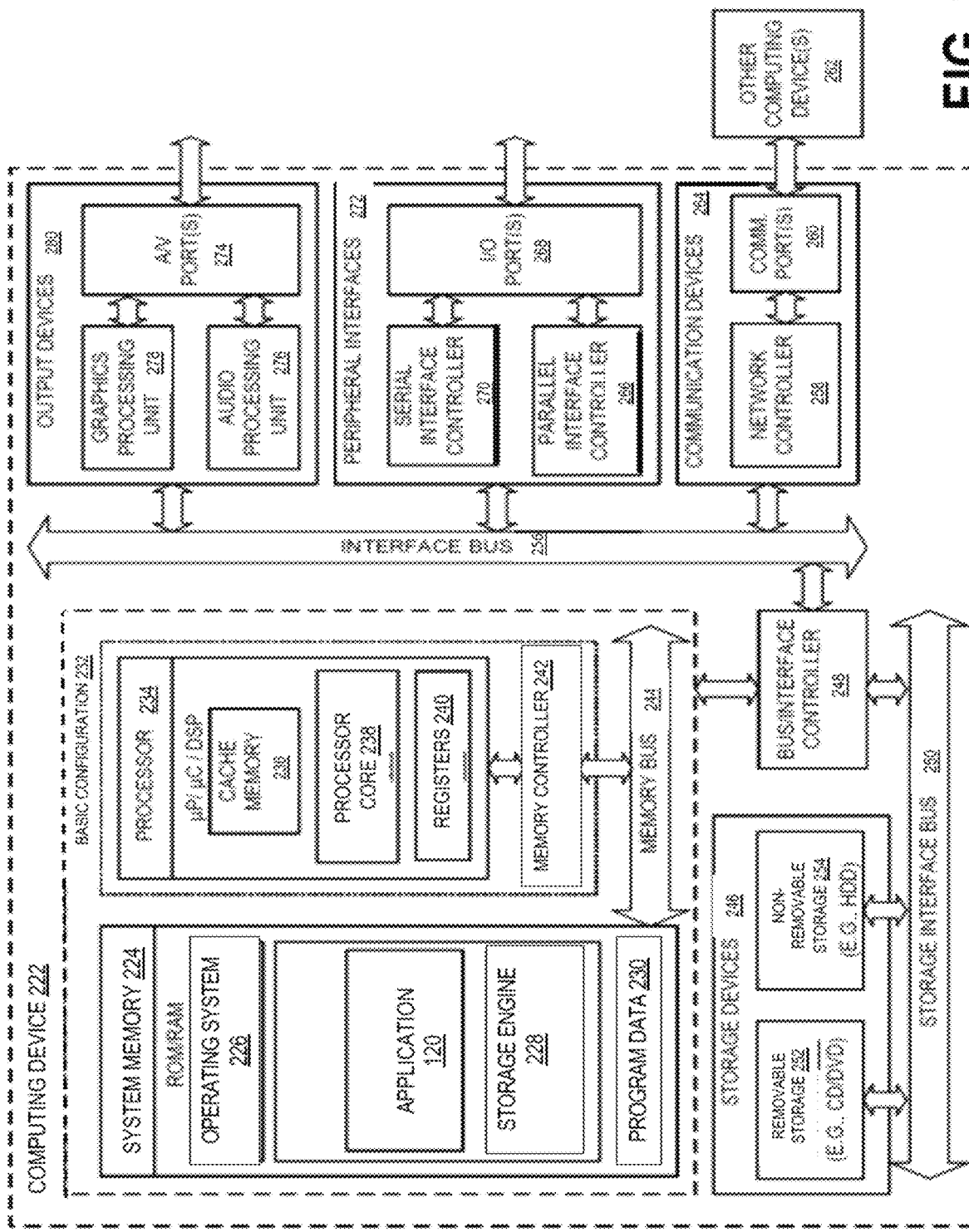
FIG. 8 depicts a block diagram of a computing device of a system, according to at least some embodiments disclosed herein.

Referring now to FIG. 8, depicted is a block diagram of a computing device included within the system described herein. In some embodiments, the present invention may include a computer system, a method, and/or the computing device 106 (of FIG. 1) or the computing device 222 (of FIG. 8).

A basic configuration 232 of a computing device 222 is illustrated in FIG. 8 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (IP), a microcontroller (C), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, the application 120, and program data 230. In some embodiments, the application 120 may be an engine, a software program, a service, or a software platform, as described infra. The system memory 224 may also include a storage engine 228 that may store any information disclosed herein, such as cooking classes, recipes, instructions, etc.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 248. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. In specific examples, the digital display of the electronics portion 108 and all other components (e.g., the devices 112) of the docking station 104 are controllable by the application 120 executable on the computing device 106.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps of providing audio and/or visual media to the cutting board assembly. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A cutting board assembly comprising:
   a cutting board, the cutting board comprising:
      a cutting surface affixable to an electronics portion via a recession in a perimeter edge of the cutting surface, the electronics portion comprising a digital display; and
   a docking station configured to receive the cutting board, the docking station comprising:
      one or more devices; and
      a wireless charger; and a computing device comprising an application, the application being in wireless communication with the electronics portion and the one or more devices of the docking station; and a protrusion extending from the electronics portion with the protrusion having a recess in an upper surface of the protrusion; wherein the protrusion is configured to be received by the recession in the cutting surface.

2. The cutting board assembly of claim 1, wherein the one or more devices are selected from the group consisting of a speaker, a camera, and a microphone.

3. The cutting board assembly of claim 1, wherein the recess is configured to receive at least one liquid.

4. The cutting board assembly of claim 1, wherein the recess is impermeable to liquid.

5. The cutting board assembly of claim 1, wherein the docking station comprises:
   a planar base; and
   a vertical component affixed perpendicular to the planar base.

6. The cutting board assembly of claim 5, wherein the vertical component is a u-shaped component comprising an opening disposed therein.

7. The cutting board assembly of claim 5, wherein the planar base comprises:
   a first side disposed opposite a second side;
   a first end disposed opposite a second end; and
   a third end disposed opposite a fourth end.

8. The cutting board assembly of claim 7, wherein the planar base further comprises a lip component affixed perpendicular to the first end.

9. The cutting board assembly of claim 5, wherein the vertical component comprises a first magnetic portion, wherein the electronics portion comprises a second magnetic portion.

10. The cutting board assembly of claim 9, wherein, when the first magnetic portion is in a magnetic attraction with the second magnetic portion, the cutting board is receivable and secured in a vertical position in a portion between the vertical component and the lip component.

11. A cutting board assembly comprising:
   a cutting board, the cutting board comprising:
      a cutting surface affixable to an electronics portion via a recession in a perimeter edge of the cutting surface, the electronics portion comprising a digital display; and
   a docking station configured to receive the cutting board, the docking station comprising:
      at least one speaker;
      at least one camera;
      at least one microphone; and
      a wireless charger; and
   a computing device comprising an application, the application being in wireless communication with the electronics portion and one or more of the at least one speaker, the at least one camera, and the at least one microphone; and
   a protrusion extending from the electronics portion with the protrusion having a recess in an upper surface of the protrusion; wherein the protrusion is configured to be received by the recession in the cutting surface.

12. The cutting board assembly of claim 11, wherein the docking station comprises:
   a planar base having a first side disposed opposite a second side, a first end disposed opposite a second end, and a third end disposed opposite a fourth end; and
   a vertical component affixed perpendicular to the planar base.

13. The cutting board assembly of claim 12, wherein the vertical component is a u-shaped component comprising an opening disposed therein, and wherein the planar base further comprises a lip component affixed perpendicular to the first end.

14. The cutting board assembly of claim 13, wherein the lip component comprises the at least one camera and the at least one microphone.

15. The cutting board assembly of claim 13, wherein the vertical component comprises the at least one speaker.

16. The cutting board assembly of claim 11, wherein the at least one speaker is configured to stream audio, and wherein the at least one camera and the at least one microphone are configured to allow a user to share and engage with visual media.

17. The cutting board assembly of claim 16, wherein the audio and the visual media are associated with a class, and wherein the class is a cooking class.

18. A cutting board assembly comprising:
   a cutting board, the cutting board comprising a cutting surface affixable to an electronics portion via a recession in a perimeter edge of the cutting surface, the electronics portion comprising a digital display;
   a computing device comprising an application, the application being in wireless communication with the electronics portion; and
   a protrusion extending from the electronics portion with the protrusion having a recess in an upper surface of the protrusion; wherein the protrusion is configured to be received by the recession in the cutting surface.

\* \* \* \* \*